United States Patent [19]
Fujiwara et al.

[11] Patent Number: 5,458,544
[45] Date of Patent: Oct. 17, 1995

[54] TOOTHED BELT AND METHOD FOR PRODUCING THE SAME

[75] Inventors: Toru Fujiwara, Tokorozawa; Yoshinori Itoh, Hanno, both of Japan

[73] Assignee: Tsubakimoto Chain Co., Osaka, Japan

[21] Appl. No.: 361,127

[22] Filed: Dec. 21, 1994

[30] Foreign Application Priority Data

Sep. 9, 1994 [JP] Japan .................................. 5-349433

[51] Int. Cl.$^6$ ...................................................... F16G 1/00
[52] U.S. Cl. ............................................ 474/205; 474/268
[58] Field of Search ........................ 474/205, 260–268; 428/375–378, 391–395

[56] References Cited

U.S. PATENT DOCUMENTS 4,762,750  8/1988  Girgis et al. ............................ 428/378
5,234,387  8/1993  Fujiwara et al. ...................... 474/268 X

*Primary Examiner*—Michael Powell Buiz
*Attorney, Agent, or Firm*—Howson & Howson

[57] ABSTRACT

Anti-wear properties and tooth life in a toothed belt are improved by taking advantage of heat hardening of a treating agent used to treat the tooth cloth. The tooth cloth is treated with a resorcinol formaldehyde latex solution containing a mixture, at a weight ratio from 1:5 to 1:15, of a resorcinol formaldehyde solution containing resorcinol and formaldehyde at a molecular ratio from 1:1 to 1:3 and a latex solution containing carboxyl modified nitrile butadiene rubber and carboxyl modified hydrogenated nitrile rubber at a weight ratio from 4:6 to 1:9, and further containing carbon at a weight ratio of 1 to 10%. The solid content adhering onto the tooth cloth is from 5 to 30 weight %.

2 Claims, 5 Drawing Sheets

ADHESIVE FORCE (kg/2cm)

HEAT-RESISTING STRENGTH RETENSION (%)

WEAR AMOUNT OF TOOTH CLOTH (CONDITION A)  (mm)

TOOTH BREAKING TIME (CONDITION B)  (h)

TOOTHED BELT AND METHOD FOR PRODUCING THE SAME

BACKGROUND OF THE INVENTION

This invention relates generally to toothed belts for power transmission and to a method for producing the same. The invention has particular utility in a toothed belt for driving the camshaft of an automobile engine.

A conventional toothed belt is composed of a tension bearing member, e.g. a set of core wires, sandwiched between a rubber tooth portion, i.e. a "tooth rubber", and a rubber back portion, i.e. a "back rubber". The outer surface of the tooth rubber is covered by a tooth cloth, which usually comprises a polyamide (nylon).

In the manufacture of the belt, the tooth cloth is typically treated with a rubber paste the composition of which is essentially the same as that of the tooth rubber and the back rubber. Alternatively, the tooth rubber is treated with a resorcinol formaldehyde latex (RFL) solution including VP-SBR latex, i.e. vinyl pyridine—styrene butadiene rubber latex. As used herein, the term "treated" includes "being impregnated", "being submerged and thereafter dried", "being coated and thereafter dried" and equivalent operations. The tooth cloth treated with RFL solution may be further treated with a rubber paste. In the past, the tooth rubber and back rubber have typically been composed of CR (chloroprene). However, more recently, primarily as a result of the tendency toward increased horsepower in automobile engines, CR (chloroprene) has been displaced by HSN (hydrogenated nitrile) as the material of the tooth rubber and back rubber.

Because automobiles are essential and are becoming more and more sophisticated, maintenance-free engine parts are highly desirable. A toothed belt is an engine component which, in the past, has been especially subject to failure. A toothed belt having a long service life is therefore particularly desirable.

To improve the service life of a toothed belt, it is essential to identify the cause of belt failure. A toothed belt usually fails as it is severed or as its teeth break. The primary object of this invention is to improve the breaking strength of the teeth in a toothed belt.

Past efforts to improve the breaking strength of the teeth in a toothed belt have generally employed means to improve the anti-wear and heat-resisting properties of the tooth cloth. Efforts to improve the anti-wear properties have included increasing the amount of fiber per unit area of the tooth cloth, and improving the anti-wear properties of the fibers used in the tooth cloth. To improve the heat resisting properties of a tooth cloth, the cloth has been treated with HSN (hydrogenated nitrile) rubber paste.

SUMMARY OF THE INVENTION

Research indicates that the treating agent has some effect upon the heat-resisting property of the tooth cloth but greatly affects the anti-wear property of the tooth cloth. In the case of a belt covered with a polyamide tooth cloth in which no treating agent was used, it was noted that the tooth surface soon became nappy, and then it became like cotton and several teeth eventually broke. This result indicates that the tooth cloth is not only bonded to the tooth rubber as result of the treatment by the treating agent, but the tooth cloth is protected by the treating agent and the density of the tooth cloth is maintained as a result of the bonding. Consequently, the anti-wear properties of the belt tooth surface may be improved, tooth breaking strength may be increased, and durability of the belt may also be improved. The wear of the tooth cloth is attributable both to its contact with the pulleys and to the contact of the fibers of the belt with one another. The treating agent is believed to protect the tooth cloth from both causes of wear.

Research further indicates that the heat resisting property of the treating agent correlates with the anti-wear property. Normally, when a toothed belt is used under high temperature conditions, a heat-resisting treating agent is utilized.

A good heat-resisting treating agent does not harden itself; and does not contribute to improvement in the anti-wear properties of a tooth cloth. On the other hand, we have discovered that a treating agent whose heat-resisting property is inferior, can contribute to improvement in the anti-wear properties of the tooth cloth as a result of hardening. In particular, it has been found that the physical properties of the treating agent vary according to temperature, and that, in the case of a treating agent having poor heat-resisting properties, its anti-wear properties may be improved unexpectedly when the belt is used under high temperature conditions.

This invention prolongs the service life of a toothed belt by taking advantage of the heat hardening property of a treating agent for a tooth cloth. More specifically, the invention solves the above-mentioned problem by treating the tooth cloth with a particular RFL (resorcinol formaldehyde latex) solution.

It has been found that a toothed belt having both heat-resisting properties and anti-wear properties may be obtained by adjusting, within a suitable range, the following factors: the molecular ratio of resorcinol and formaldehyde; the weight ratio of carboxyl modified nitrile butadiene rubber and carboxyl modified hydrogenated nitrile butadiene rubber; the weight ratio of resorcinol formaldehyde solution ("RF solution") and latex solution ("L solution"); the carbon content of the RFL solution; and the amount of the solid portion of RFL adhering to the tooth cloth.

To be suitable, the molecular ratio of resorcinol to formaldehyde in the RF solution must be the in the range of approximately 1:1 to 1:3.

If the weight ratio of carboxyl modified nitrile butadiene rubber relative to carboxyl modified hydrogenated nitrile butadiene rubber should be in the range of approximately 4:6 to 1:9. If the ratio is greater than 4:6, the heat-resistance of the tooth cloth becomes unsatisfactory and its service life may not be prolonged. On the other hand, if the ratio is less than 1:9, the anti-wear property may not be improved.

If the weight ratio of RF solution relative to L solution is greater than approximately 1:5, the tooth cloth may become unsuitably hard when the belt is formed. Consequently, formation of the belt becomes difficult. On the other hand, if the ratio of RF solution to L solution is smaller than 1:15, the adhesion of the tooth cloth to the tooth rubber becomes weak.

In the event the carbon content in the RFL solution is less than approximately 1 weight percent, the desired anti-wear property may not be obtainable. On the other hand, if the carbon content exceeds approximately 10 weight percent, the tooth cloth may become unsuitably hard when the belt is formed, and the heat-resistance will decrease. The carbon content in the RFL solution should therefore be in the range of 1% to 10% by weight, and is preferably in the range of 1% to 3% by weight.

Finally, if the solid content of RFL adhering to the tooth cloth is less than 5 weight percent, the bonding of the filaments in the tooth cloth may become poor, and consequently, the tooth rubber may separate from the filaments when the belt is formed. On the other hand, if the solid content of RFL adhering to the tooth cloth exceeds 30 weight percent, the formation of the teeth becomes difficult.

In accordance with the invention, therefore, the tooth cloth is treated with a solution containing a mixture, at a weight ratio from approximately 1:5 to 1:15, of a resorcinol formaldehyde solution containing resorcinol and formaldehyde at a molecular ratio from approximately 1:1 to 1:3 and a latex solution containing carboxyl modified nitrile butadiene rubber and carboxyl modified hydrogenated nitrile rubber at a weight ratio from approximately 4:6 to 1:9, the RFL solution further containing from about 1% to 10% by weight of carbon. The solid content adhering to the tooth cloth is from about 5 to 30 weight %.

Further objects, details and advantages of the invention will be apparent from the following detailed description, when read in conjunction with the drawings.

DETAILED DESCRIPTION

Figure 1:
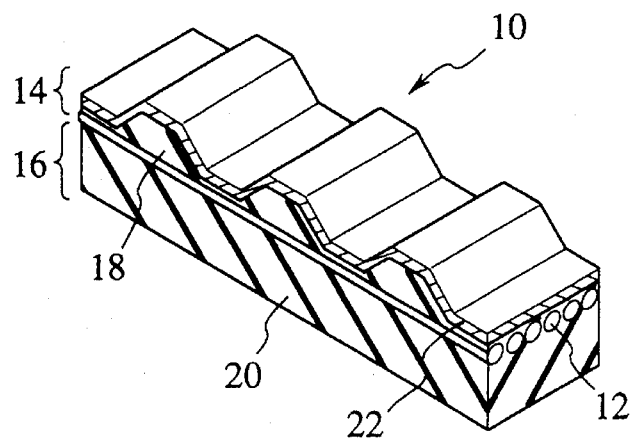
FIG. 1 is a perspective view of a toothed belt.

The toothed belt in accordance with the invention has a structure similar to that of a conventional toothed belt. As shown in FIG. 1, toothed belt 10 in accordance with the invention is composed of core wires 12, or other suitable tension bearing members, sandwiched by a tooth portion 14 and a back portion 16. The tooth portion 14 comprises a tooth rubber 18, and the back portion 16 comprises a back rubber 20. The entire tooth surface is covered by a tooth cloth 22 which usually comprises polyamide (nylon) or a similar material.

The tooth cloth 22 has been treated with a certain treating agent comprising a mixture of RF (resorcinol formaldehyde) solution and L (latex) solution at a predetermined ratio, and including a predetermined amount of carbon.

RF solution is obtained by mixing resorcinol and formaldehyde at a predetermined ratio and adding sodium hydroxide and pure, or purified, water. L solution may be obtained by mixing carboxyl modified nitrile butadiene rubber and carboxyl modified hydrogenated nitrile butadiene rubber at a predetermined ratio and adding ammonia and pure, or purified, water.

The following tables illustrate various examples of the treating agents, namely RFL solutions. The toothed belt according to the invention is treated with the RFL solutions of examples 2 or 3. Examples 1 and 4 to 9 are comparative examples.

[Tables]

| Example | 1 | 2 | 3 | 4 | 5 |
|---|---|---|---|---|---|
| RF Solution: | | | | | |
| Resorcinol (g) | 6.25 | 6.25 | 6.25 | 6.25 | 6.25 |
| Formalin (35%) (g) | 9.21 | 9.21 | 9.21 | 9.21 | 9.21 |
| NaOH (10%) (g) | 1.70 | 1.70 | 1.70 | 1.70 | 1.70 |
| Pure Water (g) | 134.01 | 134.01 | 134.01 | 134.01 | 134.01 |
| Subtotal | 151.17 | 151.17 | 151.17 | 151.17 | 151.17 |
| L Latex (g) | 221.09 | 221.09 | 221.09 | 221.09 | 221.09 |
| Kind | Carboxyl modified HSN latex[1] | 9:1 Mixture of carboxyl modified HSN latex and carboxyl modified NBR latex[2] | 6:4 mixture of carboxyl modified HSN latex and carboxyl modified NBR latex | 5:5 mixture of carboxyl modified HSN latex and carboxyl modified NBR latex | 9:1 mixture of carboxyl modified HSN latex and carboxyl modified NBR latex |
| Solid (%) | (40.00) | (40.00) | (40.00) | (40.00) | (40.00) |
| Ammonia (28%) (g) | 6.21 | 6.21 | 6.21 | 6.21 | 6.21 |
| Pure water | 601.53 | 601.53 | 601.53 | 601.53 | 621.53 |
| Subtotal | 828.83 | 828.83 | 828.83 | 828.83 | 848.83 |
| Carbon dispersed in water (10%) (g) | 20.00 | 20.00 | 20.00 | 20.00 | 0.00 |
| RFL Total weight composition (g) | 1000.00 | 1000.00 | 1000.00 | 1000.00 | 1000.00 |
| Solid (%) | 10.00 | 10.00 | 10.00 | 10.00 | 9.80 |
| R/F mol. ratio | 1/1.89 | 1/1.89 | 1/1.89 | 1/1.89 | 1/1.89 |
| Sol. RF/L wt. ratio | 1/9.34 | 1/9.34 | 1/9.34 | 1/9.34 | 1/9.34 |
| Adhesive force (kg/2 cm) | 25.0 | 25.0 | 25.0 | 25.0 | 19.1 |
| Tooth cloth strength | | | | | |

-continued

| (cross) (kgf/3 cm) | | | | | |
|---|---|---|---|---|---|
| Initial | 220 | 221 | 223 | 222 | 218 |
| After Heat aging | 128 | 122 | 119 | 113 | 119 |
| Strength retention (%) | 58 | 55 | 53 | 51 | 55 |
| Belt Test | | | | | |
| Condition A (mm) | 0.05 | 0.03 | 0.03 | 0.05 | 0 |
| Condition B (h) | 382 | 531 | 498 | 396 | 387 |
| Condition C-1 (h) | 119 | 143 | 141 | 115 | 118 |
| Condition C-2 (h) | 413 | 532 | 507 | 408 | 406 |

[1]Latex made by Nippon Zeon KK
[2]Nipol 1571 made by Nippon Zeon KK

| Example | 6 | 7 | 8 | 9 | |
|---|---|---|---|---|---|
| RF Solution: | | | | | RF Solution Ripening |
| Resorcinol (g) | 6.25 | 6.25 | 6.25 | 6.25 | Condition |
| Formalin (35%) (g) | 9.21 | 9.21 | 9.21 | 9.21 | Temperature 25° C. |
| NaOH (10%) (g) | 1.70 | 1.70 | 1.70 | 1.70 | Time 6 h |
| Pure Water (g) | 134.01 | 134.01 | 134.01 | 134.01 | |
| Subtotal | 151.17 | 151.17 | 151.7 | 151.17 | |
| L Latex (g) | 221.09 | 221.09 | 215.70 | 218.36 | RFL Solution Ripening |
| Kind | Carboxyl modified HSN latex[1] | HSN latex[2] | NBR latex[3] | VS-SBR Latex | Condition Temperature 25° C. Time 18 h Cloth adhesion 10% |
| Solid (%) | (40.00) | (40.00) | (41.00) | (40.50) | Processing Condition |
| Ammonia (28%) (g) | 6.21 | 6.21 | 6.21 | 6.21 | Drying |
| Pure water | 601.53 | 601.53 | 609.92 | 604.26 | Temperature 150° C. |
| Subtotal | 828.83 | 828.83 | 828.83 | 828.83 | Time 4 min. |
| Carbon dispersed in water (10%) (g) | 20.00 | 20.00 | 20.00 | 20.00 | Baking Temperature 220° C. Time 30 sec. |
| RFL Total weight composition (g) | 1000.00 | 1000.00 | 1000.00 | 1000.00 | |
| Solid (%) | 10.00 | 10.00 | 10.00 | 10.00 | |
| R/F mol. ratio | 1/1.89 | 1/1.89 | 1/1.89 | 1/1.89 | |
| Sol. RF/L wt. ratio | 1/9.34 | 1/9.34 | 1/9.34 | 1/9.34 | |

[1]Latex made by Nippon Zeon KK
[2]Nipol 1562 made by Nippon Zeon KK
[3]Nipol 2518FS made by Nippon Zeon KK

| Example | 6 | 7 | 8 | 9 | 10 (Prior art) |
|---|---|---|---|---|---|
| Adhesive force (kg/2 cm) | 24.0 | 25.0 | 22.0 | 9.6 | 12.0 |
| Tooth cloth strength (cross) (kgf/3 cm) | | | | | |
| Initial | 221 | 235 | 233 | 236 | 230 |
| After Heat aging | 58 | 151 | 70 | 39 | 53 |
| Strength retention | 26 | 64 | 30 | 17 | 23 |
| Belt Test | | | | | |
| Condition A (mm) | 0.05 | 0.07 | 0.07 | 0.12 | 0.08 |
| Condition B (h) | 346 | 251 | 48 | 26 | 165 |
| Condition C-1 (h) | 104 | 106 | 81 | 33 | 74 |
| Condition C-2 (h) | 381 | 274 | 147 | 112 | 291 |

Experiments were conducted to determine the adhesive strength, the heat-resisting strength retention of the tooth cloth, the amount of wear and the tooth breaking time.

Figure 2:
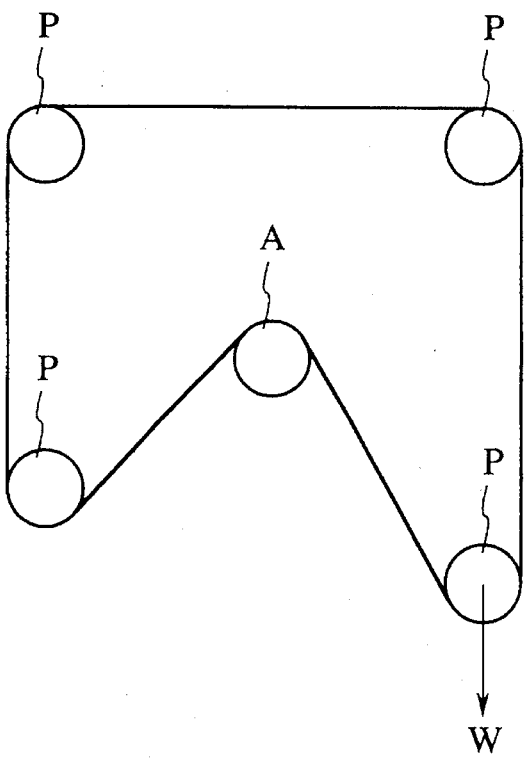
FIG. 2 is a schematic view of a testing equipment of amount of wear.

FIG. 2 illustrates schematically the equipment for testing the amount of wear of the tooth cloth. A belt having 124 teeth at a pitch of 8 mm. is run at 4000 revolutions per minute over a set of four plain pulleys P and a toothed pulley A, at a temperature of 140° C. A constant weight W is applied to one of the pulleys P, as shown, and the time is the same for each test. The condition as shown in FIG. 2 is the condition A referred to in the table.

Figure 3:
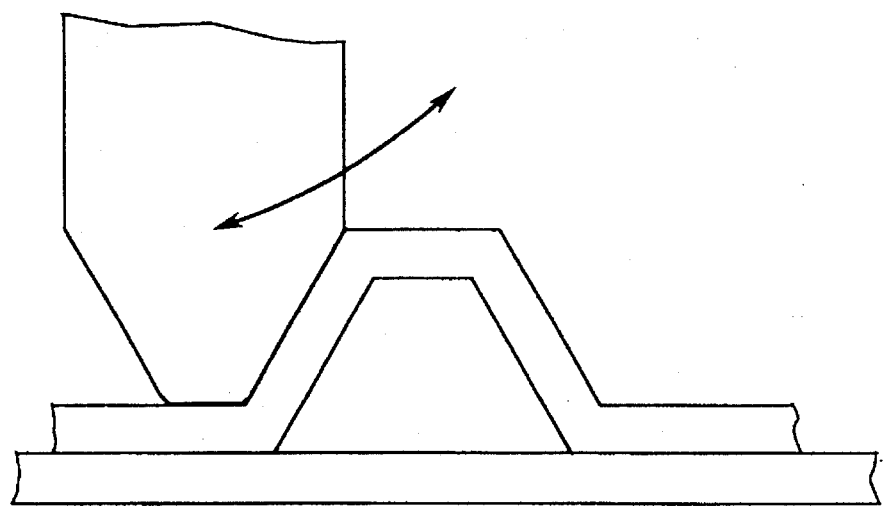
FIG. 3 is a schematic view of a testing equipment of tooth breaking time.

FIG. 3 also schematically shows testing equipment for determining tooth breaking time in a belt having teeth of constant width, by applying a constant force against a tooth at a temperature of 100° C. The condition as shown in FIG. 3 is the condition B referred to in the table.

Figure 4:
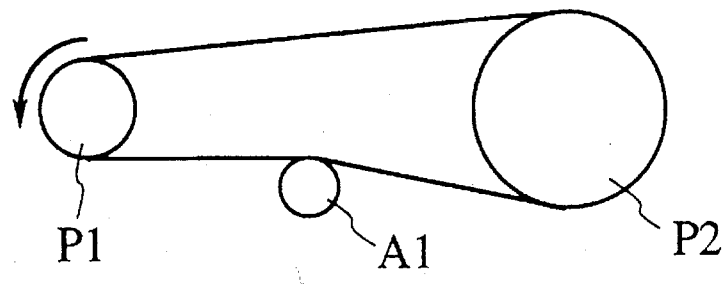
FIG. 4 is a schematic view of a testing equipment of tooth breaking time.
Figure 5:
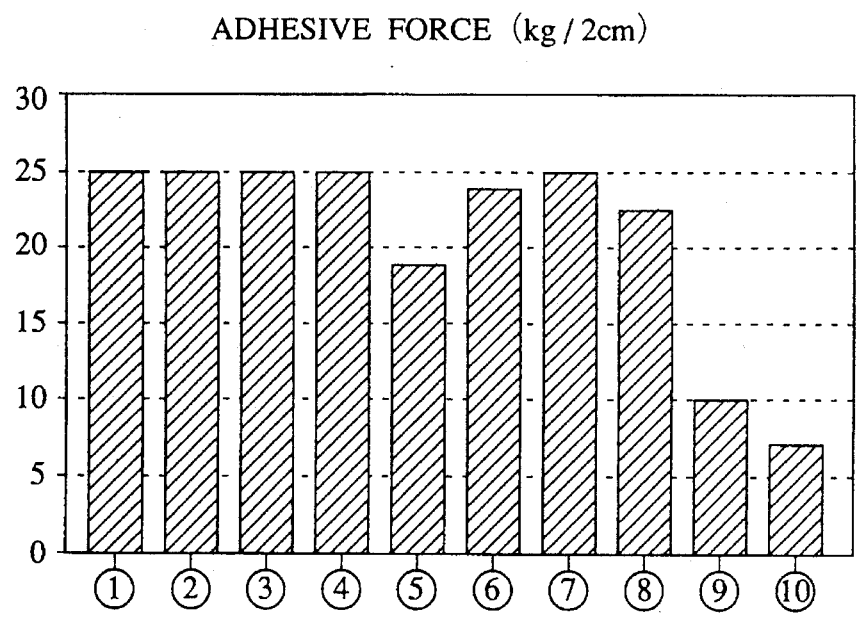
FIG. 5 is a diagram showing adhesive force between the tooth cloth and the tooth rubber having the tooth cloth treated with the agents shown in the tables.
Figure 6:
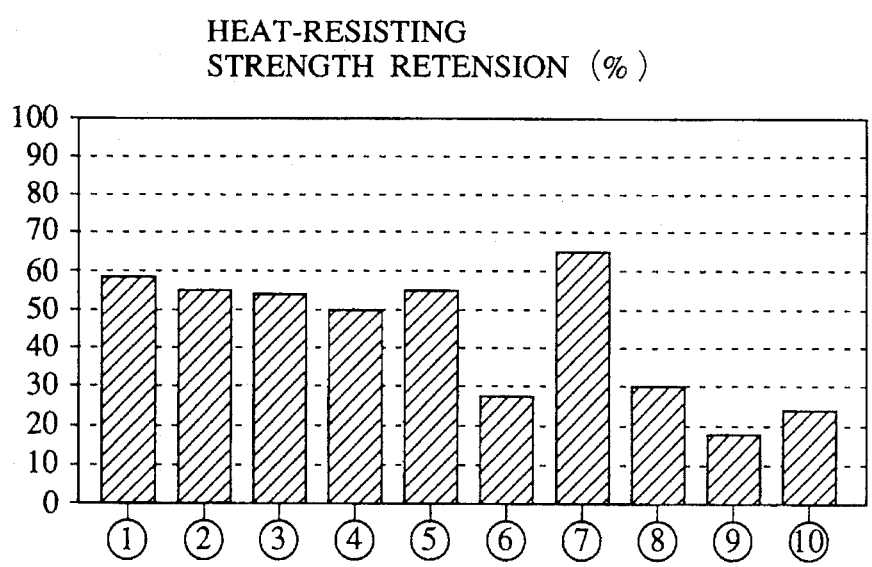
FIG. 6 is a diagram showing heat-resisting strength retention of the tooth cloth treated with the agents shown in the tables.
Figure 7:
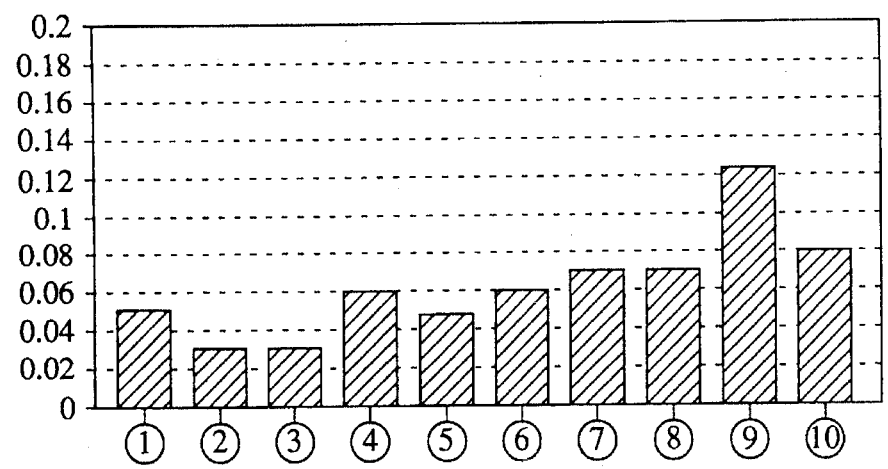
FIG. 7 is a diagram showing the amount of wear of the tooth cloth treated with the agents shown in the tables.
Figure 8:
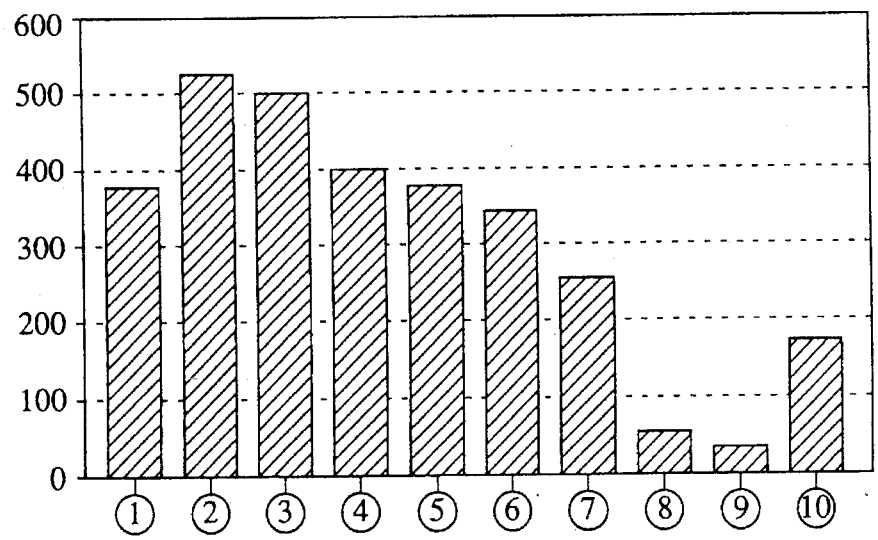
FIG. 8 is a diagram showing the tooth breaking time of the tooth cloth treated with the agents shown in the tables.
Figure 9:
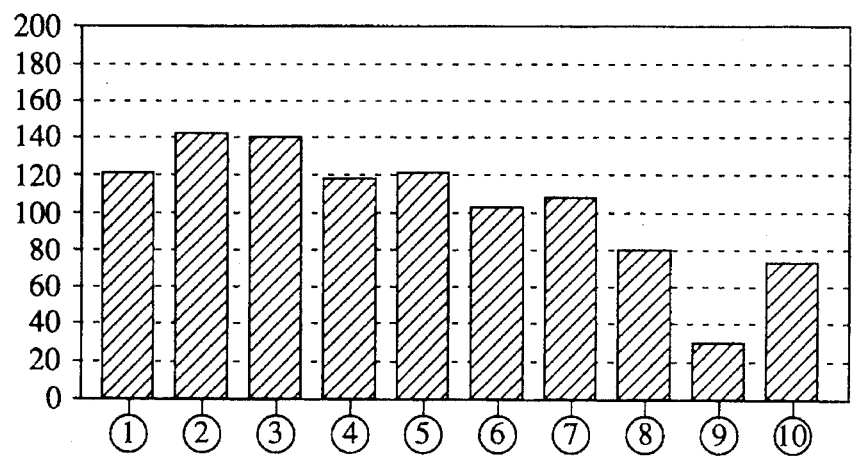
FIG. 9 is a diagram showing the tooth breaking time of the tooth cloth treated with the agents shown in the tables.
Figure 10:
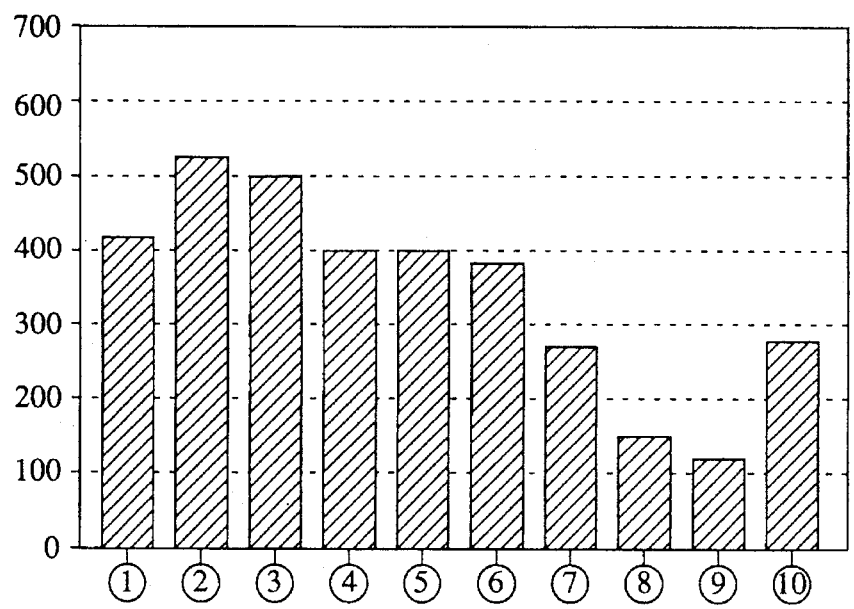
FIG. 10 is a diagram showing the tooth breaking time of the tooth cloth treated with the agents shown in the tables.

FIG. 4 illustrates equipment for testing tooth breaking time by applying tension to the belt. Here a belt having 124 teeth at a pitch of 8 mm is run over a pair of pulleys P1 and P2, having 22 and 44 teeth respectively. The lower run of the belt passes over an idler pulley having a diameter of 60 mm. An initial tension of 12 kgf is applied to the belt. The pulley P1 is rotated at 3000 rpm. The condition shown in FIG. 4 corresponds to conditions C-1 and C-2 in the table. More particularly, condition C-1 corresponds to a constant load tension of certain F kgf, and the condision C-2 corresponds to a load tension of 0.61×F kgf. The load tensions are in addition to the initial tension.

The lower parts of the tables indicate the results of various measurements. FIGS. 7 to 10 show the test results under conditions A, B, C-1 and C-2, respectively.

Referring to the tables, Example 1 is a comparative example wherein the latex (L) solution does not contain carboxyl modified nitrile butadiene rubber.

Example 4 is also a comparative example in which the weight ratio of carboxyl modified nitrile butadiene rubber relative to carboxyl modified hydrogenated nitrile butadiene rubber in the L solution is 5:5.

Example 5 is a comparative example in which the RFL solution does not contain carbon. In every other case, carbon is present in an amount equal to 2% by weight of the RFL solution, being introduced as a 10% dispersion in water.

Example 6 is a comparative example in which the L solution does not contain carboxyl modified hydrogenated nitrile butadiene rubber.

Lastly, Examples 7 to 9 are comparative examples in which the L solution contains only hydrogenated nitrile butadiene rubber, nitrile butadiene rubber or VP (vinyl pyridine) and SBR (styrene butadiene rubber), respectively.

By comparing examples 2 and 3 with comparative examples 1 and 4–9, it will be noted that the toothed belt according to the invention is remarkably superior to the comparative examples with respect to the amount of wear and tooth breaking strength, despite the fact that it is somewhat inferior to the comparative examples in terms of heat-resistance.

According to the invention, the antiwear property of the tooth cloth may be improved remarkably by taking advantage of the change of physical property of the treating agent which normally has an adverse effect, namely the change in the physical property of the treating agent due to heat degradation. The specific treating agents used in this invention become hardened due to heat degradation, and afford a superior anti-wear property to the tooth cloth. As a result, the tooth breaking time of a toothed belt, which is one of the main factors affecting performance of a toothed belt, is significantly prolonged.

Various departures from the specific examples set forth above will occur to persons skilled in the art, and may be made within the scope of the invention as defined in the following claims.

We claim:

1. A toothed belt comprising a tooth rubber and a back rubber with an embedded tension bearing member, and a tooth cloth covering the tooth rubber, in which the tooth cloth has been treated with a resorcinol formaldehyde latex solution containing a mixture at the weight ratio from about 1:5 to 1:15 of a resorcinol formaldehyde solution containing resorcinol and formaldehyde at a molecular ratio from about 1:1 to 1:3 and a latex solution containing carboxyl modified nitrile butadiene rubber and carboxyl modified hydrogenated nitrile rubber at a weight ratio from about 4:6 to 1:9; in which the resorcinol formaldehyde latex solution further contains from about 1% to 10% by weight of carbon; and in which the solid content adhered onto the tooth cloth is from about 5 to 30 weight %.

2. A method for producing a toothed belt comprising a tooth rubber and a back rubber with an embedded tension bearing member, and a tooth cloth covering the tooth rubber, comprising the steps of:

preparing a resorcinol formaldehyde latex solution by mixing, at a weight ratio from about 1:5 to 1:15, a resorcinol formaldehyde latex solution containing a mixture of a resorcinol formaldehyde solution containing resorcinol and formaldehyde at a molecular ratio from about 1:1 to 1:3 and a latex solution containing carboxyl modified nitrile butadiene rubber and carboxyl modified hydrogenated nitrile rubber at a weight ratio from about 4:6 to 1:9, the resorcinol formaldehyde latex solution further incorporating about 1% to 10% by weight of carbon;

treating the tooth cloth with said resorcinol formaldehyde latex solution so that the solid content of the resorcinol formaldehyde latex solution adheres to the tooth cloth at a weight ratio of about 5 to 30%; and covering said tooth rubber with said tooth cloth.

* * * * *